H. W. PLEISTER.
METHOD OF FORMING AN AERIAL CONDUIT, AN AERIAL CONDUIT, AND AERIAL CABLE RING.
APPLICATION FILED NOV. 4, 1920.
1,438,329.
Patented Dec. 12, 1922.
2 SHEETS—SHEET 1.
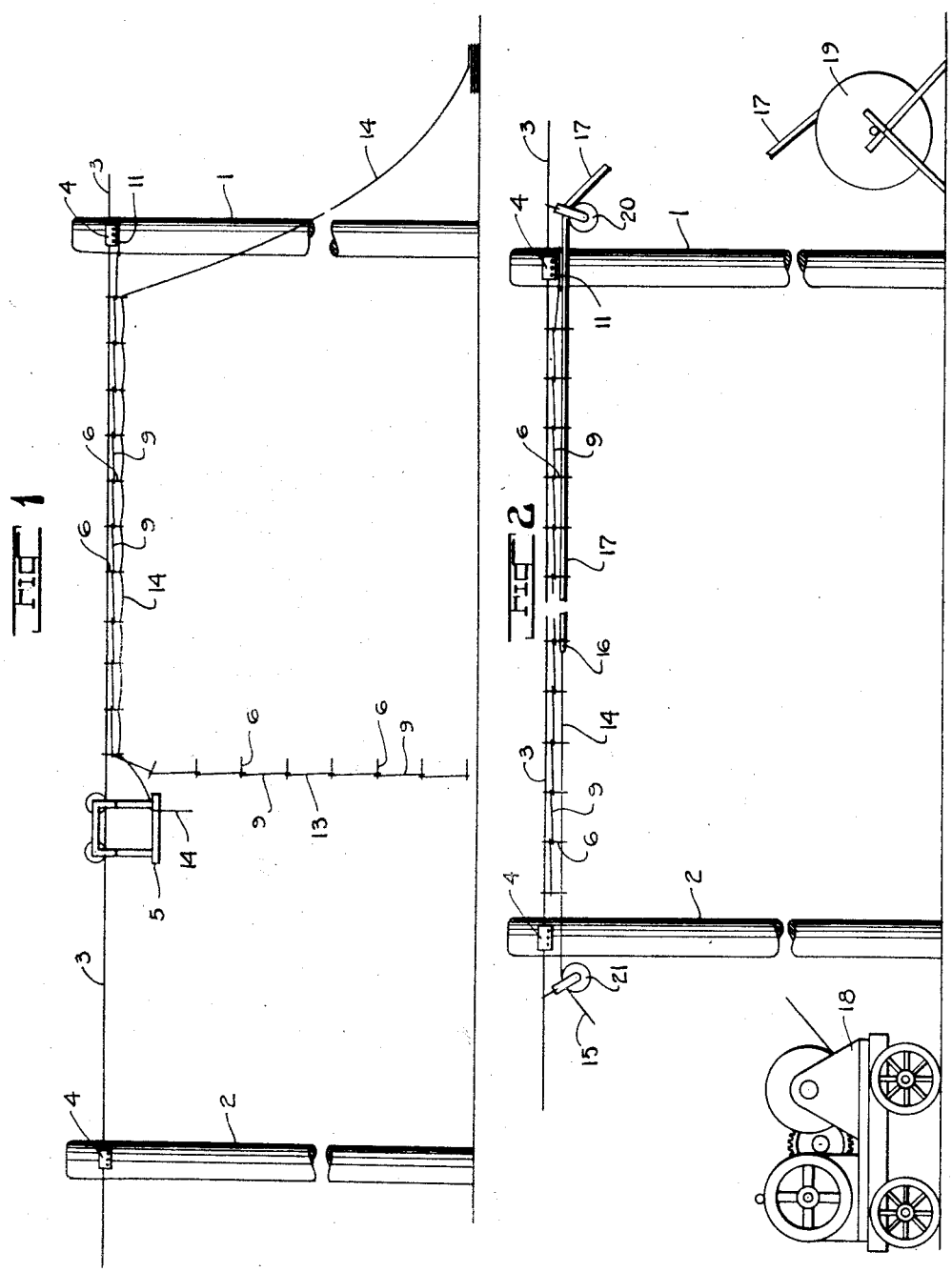

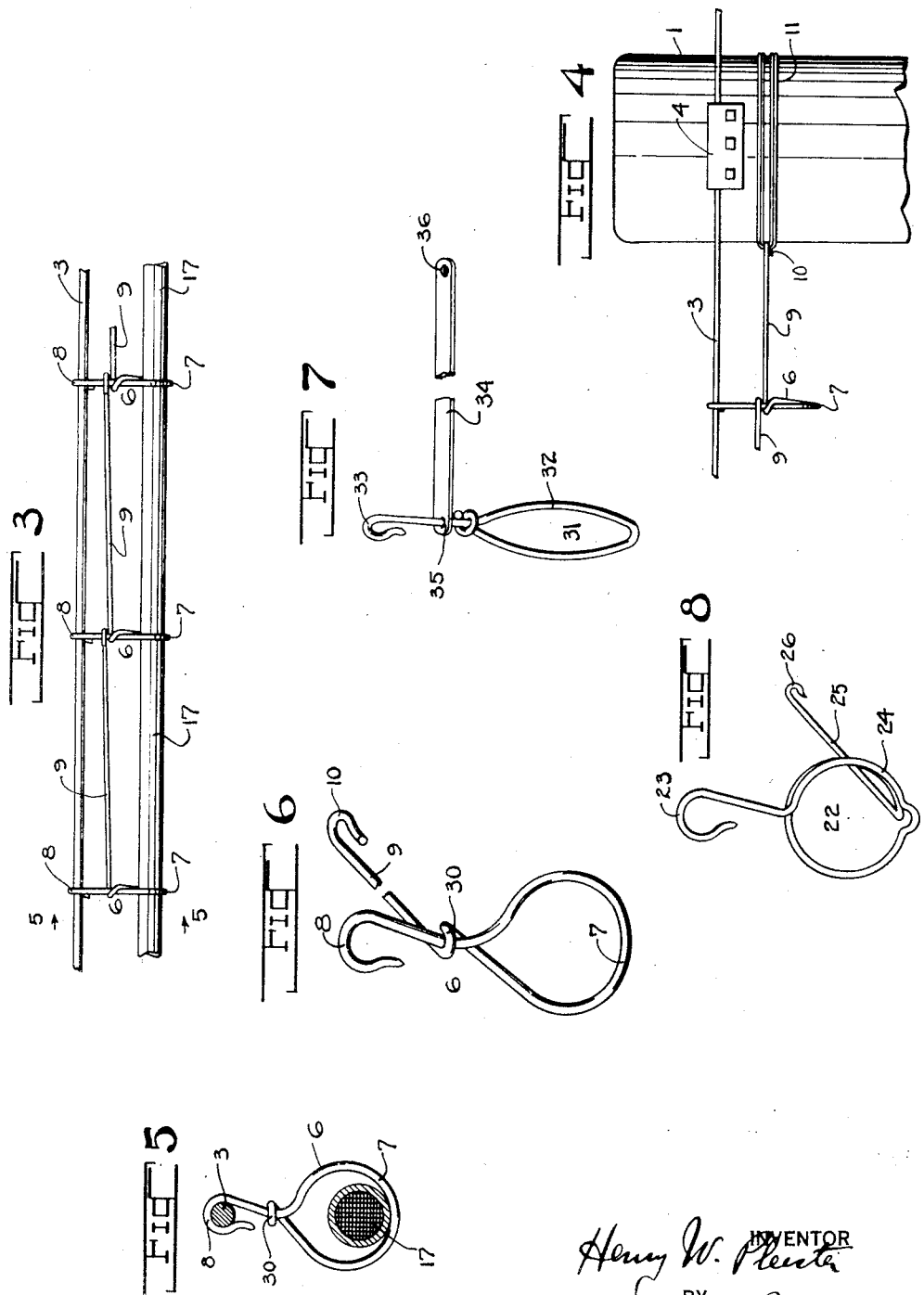

Patented Dec. 12, 1922.  1,438,329

UNITED STATES PATENT OFFICE.

HENRY W. PLEISTER, OF WESTFIELD, NEW JERSEY, ASSIGNOR, BY MESNE ASSIGNMENTS, TO HENRY B. NEWHALL, OF PLAINFIELD, NEW JERSEY.

METHOD OF FORMING AN AERIAL CONDUIT, AN AERIAL CONDUIT, AND AERIAL-CABLE RING.

Application filed November 4, 1920. Serial No. 421,745.

*To all whom it may concern:*

Be it known that I, HENRY W. PLEISTER, a citizen of the United States, residing in Westfield, in the county of Union and State of New Jersey, have invented certain new and useful Improvements in Method of Forming an Aerial Conduit, an Aerial Conduit, and Aerial-Cable Ring, of which the following is a specification, taken in connection with the accompanying drawings.

My invention relates to the telephone and telegraph arts and more particularly to a method of suspending a heavy cable from a messenger strand running from pole to pole, or from other supports.

My invention more particularly relates to the method of forming a continuous open aerial conduit and to the open aerial conduit and aerial cable rings as articles of manufacture.

My invention further relates to first forming a chain of units on the ground, and then elevating them to the level of the messenger strand and securing them thereto by simply hooking them over the strand and without the aid of any tool or tools.

My invention further relates to the aerial cable rings. These rings are preferably, though not necessarily, formed of wire, or partly from wire and partly from other material.

My invention further relates to certain combinations, methods, details of construction and sub-combinations, which will be more fully hereinafter described and set forth in the claims.

Fig. 1 is a side elevation of two poles, a messenger strand, and the method of forming my aerial conduit first in the form of a chain and then subsequently hooking it upon the messenger;

Fig. 2 is a view similar to Fig. 1 showing the manner of pulling the cable through the open aerial conduit after it has been attached to the messenger strand;

Fig. 3 is a detail enlarged side elevation of the cable, messenger strand, and open aerial conduit;

Fig. 4 is an enlarged detail showing one way of securing the messenger strand and the open aerial conduit to a pole;

Fig. 5 is a vertical section on line 5, 5 of Fig. 8 looking in the direction of the arrows;

Fig. 6 is a front perspective view of the preferred form of aerial cable ring;

Fig. 7 is a perspective view of another form of aerial cable ring;

Fig. 8 is a perspective view of still another form of aerial cable ring which I may employ.

Cables, and particularly lead covered cables, are too heavy to be strung from telephone or telegraph poles unless the poles are put so close together that the cost would be practically prohibitive. It is customary to support these heavy cables from a much smaller cable, known as a messenger strand, which strand is formed of wire rope and extends from pole to pole. It is not feasible to lift the heavy cable vertically and hook progressive portions of it to the messenger strand until all the cable is suspended. It is therefore common practice to first place spring cable rings, or soft steel hook cable rings, upon the messenger strand and support the cable by means of these cable rings. The spring cable rings are sprung on the messenger strand and held in position by friction. Locating these cable rings is very hard on the hands of the lineman. Soft steel cable rings are crimped on the messenger strand by means of tools having a powerful leverage for that purpose. After the cable rings are mounted on the messenger strand the cable is pulled through the line of rings by means of a team of horses, or gasolene or electric winder.

This crimping of the soft steel cable rings takes time and is difficult particularly if the cable runs through trees or similar obstacles to the free movement of the crimping tool. Even with the most powerful crimping tools the bite or grip of the hooks of these soft steel aerial cable rings is often not sufficient to prevent them slipping upon the messenger strand when the cable is drawn through the rings. This slipping causes the aerial rings to move in the direction of travel of the cable and to congregate against some one aerial ring which has been more firmly crimped than the others and which does not slip; or, failing to meet such a firmly crimped ring, all the rings will slide along the messenger strand until the pulling is either stopped or they are all brought up against the next pole. This requires the work to be very largely done over again, assuming that the cable has not fallen. There is always the danger of injuring some of the linemen or groundmen if the cable should fall. This is liable to occur if the rings slip leaving too large a gap between the rings. The excessive load thrown on widely separated rings will cause them to break, or their hooks to open.

The spring aerial rings now also in use are quite difficult to hook over the messenger strand requiring exertion and skill on the part of the lineman. They also will slip along the messenger occasionally.

By my invention I overcome the objections previously mentioned and form first a chain of aerial cable rings which chain is formed by a groundhand on the ground. It is then lifted by the lineman seated in a boatswain chair, and the individual hooks of each ring are simply hooked over the messenger strand without the aid of any tool or tools whatever, and without any strain upon the hands of the lineman, or any particular skill on his part.

In my invention the aerial conduit being in the form of a chain with each of the units attached together and the first unit attached to the pole, it is impossible to disarrange the spacing of the aerial cable rings upon the messenger. This spacing in my invention is mechanically perfect. The dimensions of the aerial rings, the ratio of the ring and hook, and the length of the spacing arm may be all varied to suit local conditions and the weight and capacity of the cable to be attached. In other words for certain conditions and certain weight of cable the telephone or telegraph engineers can determine in advance exactly the size of the continuous open aerial conduit, including the spacing, to be used for that particular job. When the proper size aerial conduit is used, the telephone or telegraph engineers will know that no mistakes due to human fallibility will cause the rings to be improperly spaced, either placing them so far apart to be dangerous, or putting them too close together, thereby using an unnecessary number of said rings and increasing the cost of installation.

In the drawings I have shown different embodiments of my invention by way of example only, for it is to be distinctly understood that they are merely illustrative.

In these drawings 1 and 2 are the poles, 3 is a strand of messenger wire suspended from the poles by the clamps 4, 4. In my invention a groundhand will hook the different units of the continuous open aerial conduit together and pass up one end to the lineman seated in the boatswain chair 5, suspended from the messenger strand 3.

In the preferred form of my invention the different units of my continuous open aerial conduit are formed from aerial cable rings 6, Fig. 6, which are preferably, though not necessarily, formed from wire. When formed from wire, the wire is bent to form the ring 7 and one end is bent to form the hook 8. The wire is then looped at 30 and then bent at an angle to the ring 7 to form the separator arm 9 provided with the hook 10. In this form of my invention the separator arm 9 is formed integral with the aerial cable ring.

When the end of the chain is first handed up the lineman in the boatswain seat 5 is assumed to be adjacent to the pole 1. The separator arm 9 of the first aerial cable ring 6 is secured in any suitable manner to the pole 1, as for example, by lashing it to the pole by means of marline 11, or it is secured in any other suitable manner. The groundman on the ground 12 continues to form the chain 13 by hooking the hook 10 of a new aerial ring 6 to the last ring of the chain. The lineman in the boatswain seat 5 simply lifts up this chain of aerial cable rings and hooks the hooks 8 over the messenger 3 propelling himself meanwhile along the messenger 3 toward the pole 2.

At the same time that he hooks these different units of the continuous open conduit to the messenger he feeds the end of a light pulling line 14 through the different rings 7 of the different aerial cable rings 6. As soon as he has connected the two poles 1 and 2 by a continuous length of aerial conduit he may secure the other end of the conduit to the pole 2, or he may proceed to another pole or poles as he sees fit. As soon as the required length of aerial conduit has been supported from the messenger 3 a heavy pulling line 15 is attached to the end of the light pulling line 14, which line in some localities is commonly termed a "lobster line". This heavy pulling line 15 is attached to the end 16 of the heavy lead covered cable 17 in any suitable manner, such as by splicing or otherwise securing it thereto, so as to form a smooth connection to permit it to pass readily through the different rings 7, 7, Fig. 2. The heavy pulling line 15 is then pulled through the rings 7, 7 of the open aerial conduit either by a team of horses or by a winding machine 18, Fig. 2. The lead cable 17 is unreeled from the drum 19 and passes over the sheave 20; the heavy pulling line also passing over the sheaves 20 and 21. When the end of the cable 17 reaches the pole 2, the operation previously described is repeated for another length until all the cable has been supported on the messenger strand 3.

In my invention the friction of the cable passing through the rings 7, 7 cannot alter the spacing of the different aerial cable rings, which spacing is fixed and determined by the length of the separator arm 9. The strain due to this friction is transmitted to the pole 1 by means of having the first separator arm 9 secured, in any suitable manner, to the pole. It is therefore obvious that it is not necessary to rely upon crimping the hooks 8 around the messenger 3. In the aerial cable rings that are now in use formed of spring metal, it is found in practice necessary to make them of special spring metal of a particular grade. In my invention not only do I avoid the necessity of crimping the soft steel aerial cable rings and the use of tools in attaching said aerial cable rings to the messenger strand, but I can form my aerial cable ring of wire and of a cheaper grade of stock than what has to be used to form the spring cable rings also commonly used.

Of course, other forms of aerial cable rings may be made. I have shown in Fig. 8 for example an aerial cable ring 22, Fig. 8, having a hook 23 and a ring 24, the wire being bent back upon itself so as to bring the separator arm 25 with its hook 26 at the bottom of the ring 24 to permit it to lie beneath the cable 17, instead of above the cable as in the other form just described.

Instead of forming the rings entirely out of wire, I may form them partly out of wire and partly from sheet metal.

I have shown by way of example another form of aerial cable ring 31, Fig. 7, having the ring 32 and hook 33 formed from wire. The separator arm 34 is formed from sheet metal and provided with two holes 35 and 36. The former receives the hook of the ring 31. The next adjacent ring 31 has its hook 33 threaded through the hole 36 to make a continuous open aerial conduit.

Having thus described this invention in connection with illustrative embodiments thereof, to the details of which I do not desire to be limited, what is claimed as new and what is desired to secure by Letters Patent is set forth in the appended claims.

What I claim is:—

1. The method of suspending a cable from a messenger strand consisting in first forming a continuous open aerial conduit made of a plurality of units connected to each other, suspending each unit from the messenger strand, and drawing the cable through, said units forming said open aerial conduit the units of said aerial conduit keeping their predetermined distance from each other 2. The method of suspending a cable from a messenger strand consisting in joining together a plurality of aerial cable rings to form a chain, attaching the different aerial cable rings to a messenger strand, and drawing a cable through the different aerial cable rings forming the chain the spacing of the aerial cable rings with relation to each other remaining constant.

3. The method of suspending a cable from a messenger strand consisting in joining together on the ground a plurality of aerial cable rings to form a chain, raising said chain to the level of the messenger and hooking the different aerial cable rings to the messenger to form a continuous open conduit from pole to pole with the aerial cable rings spaced a fixed and predetermined distance from each other, and then drawing a cable through said continuous open conduit the spacing of said aerial cable rings with relation to each other remaining constant.

4. A new article of manufacture comprising a continuous open conduit formed of a plurality of aerial cable rings connected together and spaced from each other, each cable ring having attaching means to engage with a messenger strand.

5. A new article of manufacture comprising a continuous open conduit formed of a plurality of aerial cable rings having means to engage with a messenger wire, each cable ring being connected together and spaced from each other the predetermined distance independently of a messenger wire to suit local conditions and the capacity of the cable to be held.

6. A new article of manufacture comprising a continuous open wire conduit formed of a plurality of aerial wire cable rings having separator arms to connect them together.

7. A new article of manufacture comprising a continuous open wire conduit formed of a plurality of aerial wire cable rings having integral wire separator arms to connect them together.

8. A new article of manufacture comprising an aerial cable ring having a ring to receive and support a cable, a hook to hook over a messenger strand, and a separator arm adapted to be attached to a similar aerial cable ring.

9. A new article of manufacture comprising an aerial wire cable ring having the wire bent back on itself to form a ring to support a cable, one end of the wire being provided with a hook to hook over a messenger strand, the other end of the wire being bent at an angle to the ring to form a separator arm, said arm being provided with means to engage a similar aerial cable ring to form a continuous open wire conduit.

10. A new article of manufacture comprising an aerial wire cable ring having the wire bent back on itself to form a ring to support a cable, one end of the wire being provided with a hook to hook over a messenger strand, and a separator arm, said arm being provided with means to engage a similar aerial cable ring to form a continuous open wire conduit.

HENRY W. PLEISTER.

Witnesses:
MARY R. RYAN,
H. M. WILLIAMS.